April 10, 1962 — B. C. SONNIER — 3,029,098
WIRE LINE FISHING TOOL
Filed June 23, 1960

INVENTOR.
BRUCE C. SONNIER
BY
*Henry H. Huth*
ATTORNEY

United States Patent Office 3,029,098
Patented Apr. 10, 1962

3,029,098
WIRE LINE FISHING TOOL
Bruce C. Sonnier, Ville Platte, La., assignor to Continental Oil Company, Ponca City, Okla., a corporation of Delaware
Filed June 23, 1960, Ser. No. 38,197
3 Claims. (Cl. 294—86)

This invention relates, as indicated, to improvements in tools used for recovering wire lines and the like lost in well bores.

As it is well known in the well servicing and producing divisions of the oil industry, wire lines are frequently used to lower various types of tools through a tubing or casing positioned in a well bore. Once in a while such a wire line is placed under sufficient tension to break or part during the manipulation or raising of a tool secured on the lower end of the wire line. When a wire line does part in a well conduit (either a tubing or casing), that section of the wire line below the breaking point usually falls downwardly in the conduit and comes to rest on the stuck tool which is attached to the lower end of the wire line. As will be apparent, the position in which the wire line is piled after falling through the conduit is wholly unpredictable. Usually, however, the upper end of the parted section extends upwardly along the walls of the conduit a substantial distance from the major portion of the length of the parted section. It will be apparent that the parted section of the wire line, as well as the tool connected to the wire line, must be removed from the well before normal production of the well can be resumed.

Heretofore, workers in the art have recovered such parted wire lines by use of a fishing tool generally in the form of a spear comprising an elongated bar having a pointed lower end and a plurality of barbs or grabs extending upwardly and outwardly from the bar. The spear is lowered through the conduit in which the parted wire line has fallen with sufficient speed that the spear will be moved downwardly between adjacent portions of the piled wire line. After the spear comes to rest, the spear is raised vertically and portions of the wire line become engaged by the barbs or grabs of the spear, such that a substantial upward force may be imposed on the parted wire line. Heretofore, however, the spear is frequently moved downwardly a substantial distance below the upper end of the parted wire line before the spear is moved upwardly to raise the parted wire line. When the upper end portion of the parted wire line does extend above the level of the spear, the upper end portion of the wire line tends to entangle the spear and provide a difficult recovery operation, with the result that the wire line used for lowering and raising the spear sometimes becomes broken or parted. Also, since the overall diameter of the spear must be substantially less than the diameter of the tubing in which it is used, the spear frequently is lowered along one side of the conduit and does not efficiently engage the parted wire line upon upward movement of the spear.

The present invention contemplates a novel fishing tool for recovering a parted wire line in a well tubing or casing wherein a guide is secured to the upper end of a wire line spear to prevent the spear from being moved below the level of the upper end of the parted wire line and to assist in maintaining the spear concentric in the well tubing or casing. The centralized position of the spear facilitates engagement of the parted wire line, and the upper end portion of the parted wire line will be engaged by the spear, rather than extend above the spear as previously, such that a parted wire line may be recovered with the maximum efficiency.

An important object of this invention is to facilitate the recovery of parted wire lines lost in well tubings or casings by recovering such parted wire lines in a minimum of time and with a minimum of effort.

Another object of this invention is to engage the upper end portion of a parted wire line during recovery of the parted wire line from a well tubing or casing, to prevent the parted wire line from fouling the operation of the recovery device.

A further object of this invention is to provide a fishing tool for recovering a parted wire line which may be easily moved downwardly through the well tubing or casing containing the parted wire line, and yet the tool will not be moved below the level of the upper end portion of the parted wire line.

A still further object of this invention is to provide a fishing tool for recovering parted wire lines which is simple in construction, may be economically manufactured, may be easily used by persons familiar with prior wire line recovering tools, and which will have a long service life.

Other objects and advantages of the invention will be evident from the following detailed description, when read in conjunction with the accompanying drawings which illustrate my invention.

Figure 2:
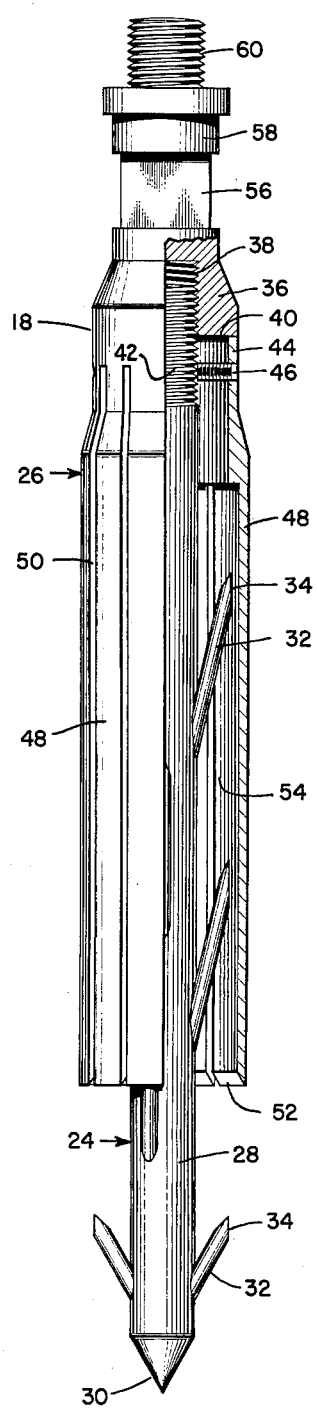
FIGURE 2 is an enlarged elevational view of a tool constructed in accordance with this invention, with a portion of the tool being shown in section to illustrate details of construction.
Figure 1:
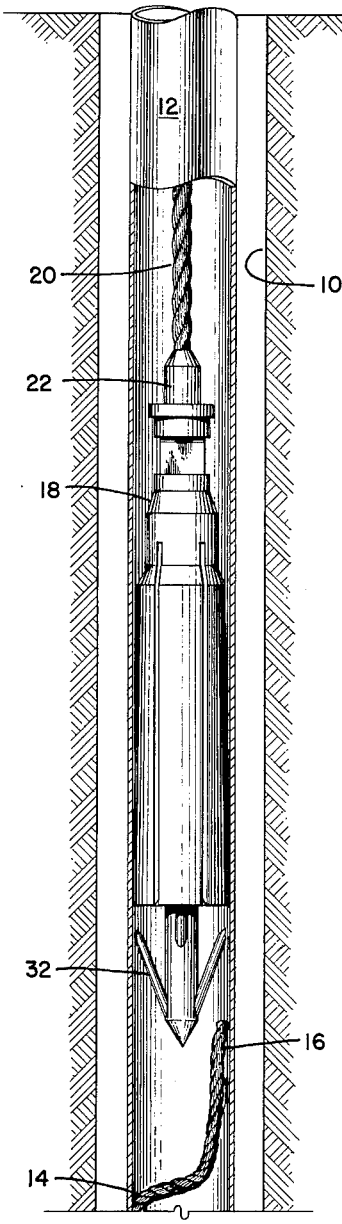
FIGURE 1 is a vertical sectional view through a portion of a well illustrating a typical use of the tool of the present invention.

Referring to the drawings in detail, reference character 10 designates a typical well bore containing a conduit 12 which may be either a well tubing or a well casing in which a wire line operated tool (not shown) has been suspended or operated by a wire line 14. As previously indicated, the wire line 14 sometimes parts or breaks in the conduit 12 and falls downwardly in the conduit 12 into an unpredicted configuration, but usually with the upper end portion 16 of the wire line being extended upwardly along the walls of the conduit 12 a substantial distance above the main portion of the length of the wire line 14. In accordance with the present invention, a novel fishing tool, generally designated by reference character 18, is lowered through the conduit 12 by any suitable means, such as a wire line 20 connected to the upper end of the tool 18 by a suitable connector 22, for recovering the parted wire line 14.

As shown most clearly in FIG. 2, the tool 18 generally comprises a wire line spear 24 and a guide 26 controlling the operation of the spear 24, as will be described. The spear 24 comprises an elongated bar 28 which is usually circular in cross section and has the lower end 30 thereof pointed to facilitate downward movement of the spear between portions of the parted wire line 14 which has fallen and become piled in the conduit 12. A plurality of grabs 32 are suitably secured in randomly spaced relation around the bar 28 throughout the major portion of the length of the bar 28. Each grab 32 is extended upwardly and outwardly from the bar 28 and may be of any desired cross sectional construction to provide the necessary strength for recovering the parted wire line 14. Also, the outer end 34 of each grab 32 is preferably pointed to facilitate the engagement of the wire line 14 by the grabs. It should further be noted that the overall diameter of the spear 24 is less than the inner diameter of the conduit 12 in which the tool 18 is to be used, such that the spear 24 may move freely downwardly through the conduit 12. In other words, an imaginary cylinder defined by the pointed ends 34 of the grabs 32 must have a diameter less than the inner diameter of the conduit 12.

The guide 26 comprises a head portion 36 having an internally threaded bore 38 therein communicating with the lower end 40 of the head. The threaded bore 38 is of a size to receive the upper threaded end portion 42 of the bar 28 and provide an adequate connection of the guide 26 to the spear 24. Also, a tubular skirt portion 44 depends from the lower end 40 of the head 36 and supports suitable set screws 46 which extend inwardly into engagement with the upper end portion 42 of the bar 28 to assure that the guide 26 will not become disconnected from the spear 24 during operation of the tool.

A plurality of circumferentially spaced fingers 48 depend from the lower end of the skirt 44 to engage the inner periphery of the conduit 12 during upward and downward movements of the tool 18 through the conduit. It will also be noted that each finger 48 is extended outwardly of the head 36, such that the cylinder formed by the fingers 48 is larger in diameter than the head 36. The width of each space 50 between adjacent fingers 48 is less than the diameter of the parted wire line 14 to be recovered, to prevent the parted wire line from becoming entangled between adjacent fingers 48, as will be described. Also, the lower end 52 of each finger 48 is preferably tapered downwardly and outwardly to guide the upper end portion 16 of the parted wire line 14 into the chamber 54 formed between the fingers 48 and the bar 28, as will also be described. It will be apparent that the fingers 48 are positioned around the grabs 32 extending along the major portion of the spear 24, such that the fingers 48 will keep the grabs 32 out of direct contact with the conduit 12 during lengthwise movement of the tool 18 through the conduit.

In a preferred embodiment of this invention, the fingers 48 are formed of spring steel or the like and are biased outwardly from the head 36, such that the fingers 48 will be maintained in what may be considered resilient contact with the inner periphery of the conduit 12 during a fishing operation. As a result, the fingers 48 can easily slide through restrictions and depressions (not shown) in the conduit 12, such as may be provided by collars or couplings between adjacent sections of the conduit 12. Forming the fingers 48 of a resilient material also facilitates the initial insertion of the tool 18 in the conduit 12, as will be described.

As shown in the upper portion of FIG. 2, suitable flats 56 are formed on the head 36 of the guide 26 to facilitate the use of a wrench (not shown) in connecting and disconnecting the guide 26 from the spear 24. A fishing neck 58 is formed on the guide 26 above the flats 56 to facilitate the recovering of the tool 18 in the event the tool 18 is lost in a well. As it is well known in the art, the fishing neck 58 facilitates the engagement of the tool 18 by conventional grappling devices (not shown). A threaded shank 60 projects above the fishing neck 58 for connection with the socket-type connector 22 of the wire line 20 which is used for raising and lowering the tool 18 in the conduit 12.

*Operation*

When the conduit 12 is in the form of a well tubing, various fittings (not shown) are normally connected to the upper end of the conduit 12 and these fittings provide one or more restricted portions having a diameter smaller than the inner diameter of the conduit 12. When the tool 18 is used under these circumstances, a cotton string or the like (not shown) is tied around the lower end portions 52 of the fingers 48 to bend the fingers 48 inwardly into contact with the adjacent grabs 32 and decrease the overall diameter of the tool 18. The tool 18 is then inserted through these various fittings and suspended in the conduit 12 by means of the wire line 20. The cotton string rubs along the inner periphery of the conduit 12 during the initial portion of the downward movement of the tool 18 to break the string and free the fingers 48 for outward movement into contact with the inner periphery of the conduit 12. The fingers 48 then slide downwardly along the inner periphery of the conduit 12 during downward movement of the tool 18.

The tool 18 is lowered through the conduit 12 until the tool comes to rest by contact with the parted wire line 14. It will be apparent that the lower pointed end 30 of the spear 24 facilitates downward movement of the spear 24 between adjacent portions of the parted wire line 14 piled in the conduit 12, such that a sufficient portion of the wire line 14 will be engaged by the grabs 32 for a recovery operation. As the guide 26 reaches the upper end portion 16 of the parted wire line 14, the wire line portion 16 is moved inwardly toward the bar 28 by the tapered ends 52 of the fingers 48, such that the upper end portion 16 of the parted wire will be positioned in the chamber 54 between the fingers 48 and bar 28 and will be contacted by the head portion 36 to prevent the tool 18 from being lowered entirely below any portion of the wire line 14. It may also be noted that since the spaces 50 between adjacent fingers 48 are narrower than the diameter of the parted wire line 14, the upper end portion 16 of the parted wire line will not become entangled between adjacent fingers 48, but will be efficiently directed into the chamber 54. It may be further noted that the guide 26 will tend to retain the spear 24 centralized in the conduit 12 to facilitate the movement of the lower end portion of the spear 24 between adjacent portions of the parted wire line 14.

When the tool 18 comes to rest at the end of the lowering operation, as will be indicated by the appearance of slack in the wire line 20, the wire line 20 is placed under tension and pulled upwardly through the conduit 12 to raise the tool 18. During the initial upward movement of the tool 18, the upper end portion 16 of the wire line 14 will become engaged by the grabs 32 positioned in the chamber 54 to prevent the end portion 16 of the parted wire line from being bent over and fouling operation of the tool. The lower grabs 32 of the spear 24 will engage adjacent portions of the wire line 14, such that sufficient force may be imposed on the parted wire line 14 for recovery thereof. In this connection it may be noted that the spear 24 can be extended below the guide 26 any desired distance to assure that the parted wire line 14 will be adequately engaged by the spear.

From the foregoing it will be apparent that the present invention will materially facilitate the recovery of a parted wire line lost in a well tubing or well casing by providing an engagement of the lost and parted wire line in a minimum of time and with a minimum of effort on the part of the operator. The present tool cannot be lowered to a level below the upper end portion of the parted wire line, but will efficiently engage the upper portion of the parted wire line for an easy and efficient recovery of the parted wire line. It will further be apparent that the present tool is simple in construction, may be economically manufactured, may be used by persons skilled with existing wire line fishing tools, and the tool will have a long service life.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. A fishing tool for recovering a wire line parted and lost in a well conduit, comprising an elongated bar having an upper end and a lower end, wire line grabs extending upwardly and outwardly from the bar in randomly spaced relation along the length of the bar to form a wire line spear, said spear being of a size to move freely lengthwise through the well conduit containing the parted wire line, means for lowering and raising the spear through the conduit, and a guide secured to the upper end of the spear and extending radially outwardly of said grabs into sliding contact with the walls of the conduit, said guide comprising a head secured on the upper end of said bar and a plurality of fingers depending from the head in circumferentially spaced relation around the upper end portion of the spear, the outer surfaces of said fingers substantially describing a cylinder having a cross sectional area greater than that of the head and adjacent fingers being spaced apart a distance less than the diameter of the parted wire line.

2. A fishing tool as defined in claim 1 wherein said fingers are formed of spring steel and are biased outwardly from the spear for sliding contact with the walls of the conduit containing the parted wire line, each of said fingers having an upper end and a lower end, and the lower end of each of said fingers being tapered downwardly and outwardly to guide the parted wire line into the chamber formed between the fingers and said bar.

3. A fishing tool as defined in claim 1 wherein said head is threadedly secured around the upper end of said bar, and characterized further to include a fishing neck formed on said head above said fingers.

References Cited in the file of this patent
UNITED STATES PATENTS

| | | |
|---|---|---|
| 1,612,041 | Morris | Dec. 28, 1926 |
| 2,345,727 | Burch | Apr. 4, 1944 |
| 2,621,067 | Jacobson | Dec. 9, 1952 |